US012788674B1

(12) United States Patent
Li

(10) Patent No.: US 12,788,674 B1
(45) Date of Patent: Nov. 10, 2026

(54) MASSAGER HAVING AN ANGLE ADJUSTING MECHANISM

(71) Applicant: Lan Li, Dongguan (CN)

(72) Inventor: Lan Li, Dongguan (CN)

( * ) Notice: Subject to any disclaimer, the term of this patent is extended or adjusted under 35 U.S.C. 154(b) by 1 day.

(21) Appl. No.: 19/442,061

(22) Filed: Jan. 7, 2026

(30) Foreign Application Priority Data

Dec. 11, 2025 (CN) ......................... 202522631565.6

(51) Int. Cl.
*A61H 19/00* (2006.01)
*A61H 23/02* (2006.01)

(52) U.S. Cl.
CPC ..... *A61H 23/0254* (2013.01); *A61H 23/0245* (2013.01); *A61H 2201/0153* (2013.01); *A61H 2201/0165* (2013.01); *A61H 2201/0192* (2013.01); *A61H 2201/123* (2013.01); *A61H 2201/1671* (2013.01); *A61H 2201/503* (2013.01); *A61H 2209/00* (2013.01)

(58) Field of Classification Search
CPC ........ A61H 19/00; A61H 19/30; A61H 19/32; A61H 19/34; A61H 19/50
See application file for complete search history.

(56) References Cited

U.S. PATENT DOCUMENTS 6,179,795 B1 * 1/2001 Garza .................... A61H 19/30 600/38
9,737,458 B1 * 8/2017 Olivares ................ A61H 21/00
11,857,480 B1 * 1/2024 Wu ......................... A61H 19/40
2003/0009116 A1 * 1/2003 Luettgen ................ A61H 19/34 601/72
2013/0253386 A1 * 9/2013 Nan ................... A61H 23/0263 29/428
2015/0313749 A1 * 11/2015 Hahr .................. A61H 23/0263 600/39
2016/0106569 A1 * 4/2016 Hahr ......................... A61F 5/41 600/41
2017/0042758 A1 * 2/2017 Cregan .................. A61H 23/02
2020/0368103 A1 * 11/2020 Rakshit .................. A61H 19/50
2021/0322202 A1 * 10/2021 Xu ............................ A61F 5/41
2023/0096701 A1 * 3/2023 Sridhar .............. A61H 23/0218 600/38
2026/0069492 A1 * 3/2026 Jackson, III ........... A61H 19/50

OTHER PUBLICATIONS

English translation of Schurig (DE 10 2015108058 A1) (Year: 2016).*

* cited by examiner

*Primary Examiner* — Timothy A Stanis
*Assistant Examiner* — Christopher E Miller
(74) *Attorney, Agent, or Firm* — HOWARD M COIIN and Associates, LLC

(57) ABSTRACT

A massager includes a main body, a massage component, and an angle adjusting mechanism. A root of the massage component is rotatably mounted on the main body. The angle adjusting mechanism is disposed between the massage component and the main body to adjust an angle of an extending axis of the massage component around a connecting axis of the main body.

19 Claims, 11 Drawing Sheets

MASSAGER HAVING AN ANGLE ADJUSTING MECHANISM

TECHNICAL FIELD

The present disclosure relates to a technical field of massage devices, and in particular to a massager.

BACKGROUND

With the fast pace of modern life and work, people often feel physically and mentally exhausted. Massaging the body through manual manipulation or with a therapeutic massage device not only helps promote blood circulation and relax muscle tissue, but also relieves stress and enhances comfort to some extent, offering excellent health and relaxation benefits. To meet growing market demands, various massagers are created. However, conventional massagers have limited functionality and are restrictive in certain applications. Furthermore, adjustment flexibility of the conventional massager is insufficient, resulting in a less than ideal level of comfort and effectiveness in actual use.

SUMMARY

The present disclosure provides a massager where an angle between a massage component and a main body thereof is adjustable, leading to a good sensory experience.

The massager comprises a main body, a massage component, and an angle adjusting mechanism. A root of the massage component is rotatably mounted on the main body. The angle adjusting mechanism is disposed between the massage component and the main body to adjust an angle of an extending axis of the massage component around a connecting axis of the main body.

In some embodiments, the main body is column-shaped. The massage component is rotatably mounted on a middle portion of the main body. A rotation axis of the massage component is substantially perpendicular to an extending axis of the main body.

In some embodiments, the main body is in a ring shape with an opening, the opening is closed to form a central hole, and the root of the massage component is rotatably mounted at the opening of the main body.

In some embodiments, the main body is in a ring shape and has a connecting shaft, and the massage component is rotatably mounted on the connecting shaft. The angle adjusting mechanism comprises an adjusting assembly and an adjusting fitting piece. The adjusting assembly is disposed on the connecting shaft. The adjusting assembly comprises an elastic piece and an adjusting piece driven by the elastic piece. The adjusting fitting piece is fixedly connected to the massage component and capable of interacting with the adjusting piece. When the massage component rotates around the connecting shaft, a rotation angle and a position of the massage component relative to the main body is adjusted by an interaction between the adjusting piece and the adjusting fitting piece.

In some embodiments, when driven by the elastic piece, the adjusting piece maintains elastic contact with a surface of the adjusting fitting piece and provides continuous frictional torque to realize stepless angle adjustment and positioning.

In some embodiments, adjusting holes disposed at intervals are defined on a circumferential direction of the adjusting fitting piece. When driven by the elastic piece, the adjusting piece is capable of extending into any one of the adjusting holes, so as to realize stepped angle adjustment and positioning.

In some embodiments, the adjusting fitting piece comprises a mounting hole. The adjusting fitting piece is sleeved on the main body through the mounting hole. The adjusting holes are disposed on a hole wall of the mounting hole. The adjusting holes are disposed at intervals along a circumferential direction of the mounting hole. When the massage component rotates around the main body, the adjusting piece selectively extends into or disengages from any one of the adjusting holes along a radial direction under driving of the elastic piece.

In some embodiments, the adjusting piece comprises an adjusting pin. A side surface of the adjusting pin is capable of extending into any one of the adjusting holes. The side surface of the adjusting pin is a semi-spherical surface. A bottom wall of each of the adjusting holes is an arc surface matched with the side surface of the adjusting pin.

In some embodiments, the massage component comprises a flexible shell and a first vibrator. The flexible shell comprises an assembling hole and a receiving cavity communicated with the assembling hole. The assembling hole is configured to mount the adjusting fitting piece. The first vibrator is disposed in the receiving cavity. The flexible shell is rotatably mounted to the main body through the adjusting fitting piece.

In some embodiments, the adjusting fitting piece comprises a fitting portion and a limiting portion. The fitting portion is embedded in the mounting hole and defines the mounting hole. The limiting portion is connected to the fitting portion and extends into the receiving cavity. The limiting portion is attached to a cavity wall of the receiving cavity. The limiting portion comprises a first wiring channel communicated with the mounting hole and the receiving cavity.

In some embodiments, the limiting portion comprises: a connecting segment and a limiting segment. A first end of the connecting segment is connected to the fitting portion. The limiting segment is connected to a second end of the connecting segment away from the fitting portion. A step structure is formed between the limiting segment and the connecting segment. A limiting step corresponding to the step structure is formed on the cavity wall of the receiving cavity. The limiting segment abuts against the limiting step.

In some embodiments, an outer diameter of the limiting segment is reduced in a direction away from the connecting segment.

In some embodiments, the main body comprises a first main body portion, a second main body portion, and a flexible outer housing. The first main body portion comprises the connecting shaft and a mounting portion connected to the connecting shaft. The mounting portion is in an arc shape. The second main body portion is in an arc shape and is connected to one end of the connecting shaft away from the mounting portion. The flexible outer housing is a ring structure having a notch. Two opposite ends of the flexible outer housing are respectively sleeved on the mounting portion and the second main body portion. The connecting shaft is exposed at the notch and forms an annular structure together with the flexible outer housing. The adjusting assembly is mounted on the connecting shaft. The adjusting fitting piece is sleeved on the connecting shaft and is matched with the adjusting assembly. The massage component is rotatable around the connecting shaft through the adjusting fitting piece.

In some embodiments, a mounting groove is formed on the connecting shaft, and the adjusting assembly is mounted on the mounting groove.

In some embodiments, the first main body portion comprises a first shell and a second shell. The first shell and the second shell are fixedly enclosed in a front-rear direction. The first shell and the second shell respectively form a front half portion and a rear half portion of the connecting shaft. The front half portion of the connecting shaft on the first shell defines the mounting groove.

In some embodiments, the massage component comprises a flexible shell and a first vibrator disposed in a receiving cavity of the flexible shell. The first main body portion comprises a first shell assembly, a control assembly, control buttons, and a power supply. The first shell assembly comprises the mounting portion and the connecting shaft. The mounting portion defines a first mounting cavity, and the connecting shaft defines a second wiring channel communicated with the first mounting cavity. The control assembly is disposed in the first mounting cavity. The control buttons are disposed on a surface of the first shell assembly facing an outside. The control buttons are in signal connection with the control assembly. The power supply is disposed in the first mounting cavity and is configured to supply power to the first vibrator and the control assembly. The flexible shell is connected to the connecting shaft. The second wiring channel is communicated with the receiving cavity.

In some embodiments, the second main body portion comprises: a second shell assembly and a second vibrator. A second mounting cavity is formed in the second shell assembly defines therein. The second shell assembly is connected to the connecting shaft. The second vibrator is disposed in the second mounting cavity. The power supply is further configured to supply the power to the second vibrator. The second wiring channel is further communicated with the first mounting cavity and the second mounting cavity.

In some embodiments, the two opposite ends of the flexible outer housing respectively define a first accommodating cavity and a second accommodating cavity. The mounting portion is accommodated in the first accommodating cavity. The connecting shaft extends out of an opening of the first accommodating cavity. The second main body portion is detachably connected to the one end of the connecting shaft away from the mounting portion. The second main body portion is accommodated in the second accommodating cavity.

The main body further comprises: a first sleeve and a second sleeve. The first sleeve is sleeved on the connecting shaft and is disposed on a first side of the massage component. A first end of the first sleeve is sealingly connected to an edge of the opening of the first accommodating cavity. A second end of the first sleeve extends into the mounting hole of the adjusting fitting piece and is in sealing fit with the adjusting fitting piece. The second sleeve is sleeved on the connecting shaft and is disposed on a second side of the massage component. A first end of the second sleeve is sealingly connected to an edge of an opening of the second accommodating cavity. A second end of the second sleeve extends into the mounting hole of the adjusting fitting piece and is in sealing fit with the adjusting fitting piece.

In some embodiments, a first stop portion is disposed on one of the first sleeve and the second sleeve. A second stop portion is disposed on a hole wall of the mounting hole. A range of the rotation angle of the massage component relative to the connecting shaft is defined by a relative position of the first stop portion in contact with the second stop portion.

In some embodiments, the main body further comprises a first sealing ring and a second sealing ring. The first sealing ring is disposed between the first sleeve and the adjusting fitting piece, and the second sealing ring is disposed between the second sleeve and the adjusting fitting piece.

In some embodiments, a limiting groove extending along an axial direction is formed on an outer surface of the connecting shaft. Limiting protrusions are respectively disposed on an inner wall of the first sleeve and an inner wall of the second sleeve. The limiting protrusions are matched with the limiting groove to prevent the first sleeve and the second sleeve from rotating in the circumferential direction.

In some embodiments, two first connecting holes are respectively protruded outward from two opposite end portions of the flexible outer housing, and the two first connecting holes are respectively disposed on two opposite sides of the massage component. Two second connecting holes are defined on one side of the flexible outer housing away from the massage component, and the two second connecting holes are respectively disposed on the two opposite sides of the massage component.

In some embodiments, the extending axis of the massage component is substantially perpendicular to the connecting axis of the main body. The connecting axis of the main body is located at a connection point of the extending axis of the massage component and the main body.

In the massager of the present disclosure, the angle adjusting mechanism enables a user to adjust the rotation angle of the massage component relative to the main body. The user is able to flexibly adjust an angle of a massage working end of the massage component according to personal usage habits or contours of different parts of the human body, thereby improving the fit and comfort of the massage.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

Figure 1:
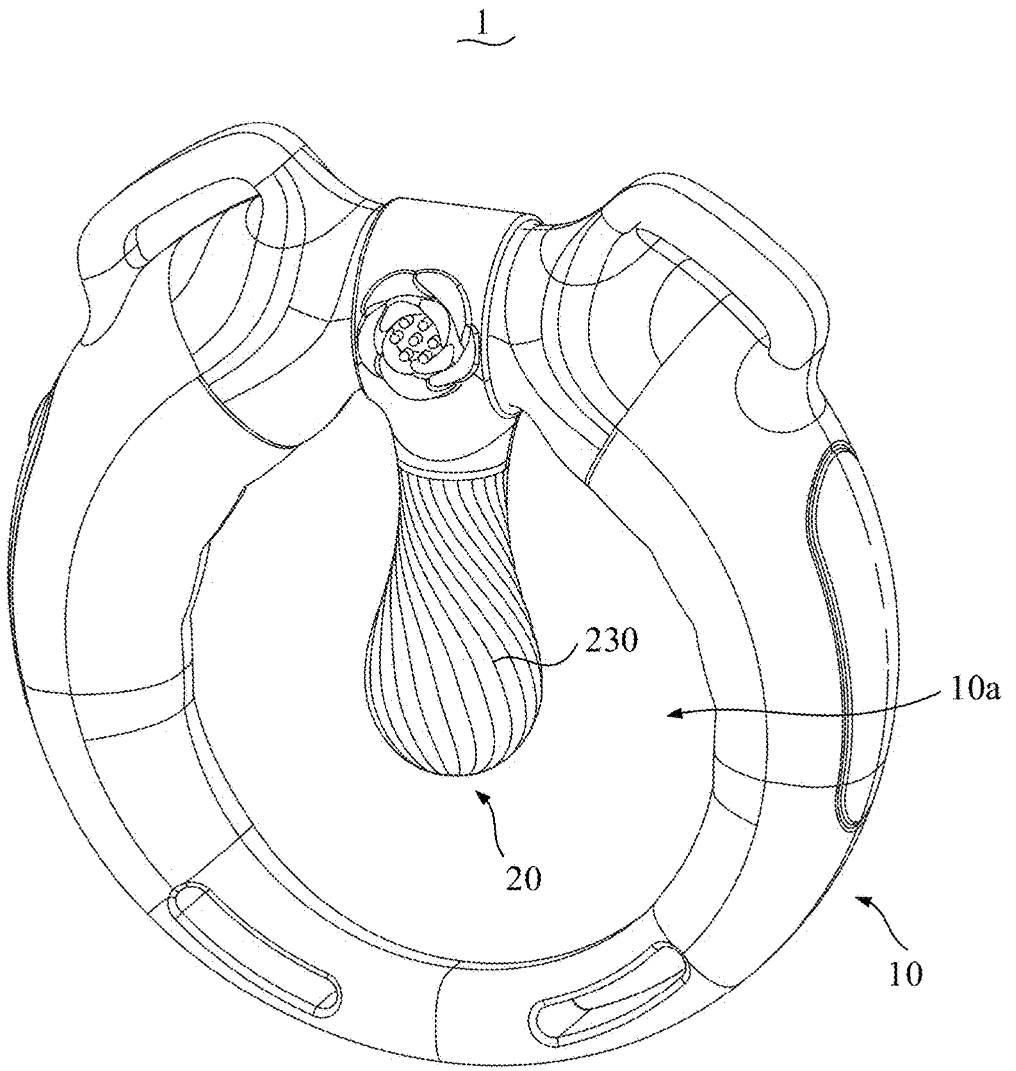
FIG. 1 is a schematic diagram of a massager according to one embodiment of the present disclosure.

In the drawings: 1—massager; 10—main body; 10*a*—central hole 110—first main body portion; 111—first shell assembly; 1111—mounting portion; 1112—connecting shaft; 1113—first mounting cavity; 1114—second wiring channel; 1115—mounting groove; 1116—limiting groove; 1117—mating hole; 1118—first shell; 1119—second shell; 112—control assembly; 113—control button; 114—power supply; 115—conductive pin; 120—second main body portion; 121—second shell assembly; 1211—second mounting cavity; 1212—third shell; 1213—fourth shell; 1214—inserting portion; 122—second vibrator; 130—flexible outer housing; 130*a*—notch; 131—first accommodating cavity; 132—second accommodating cavity; 133—first connecting hole; 134—second connecting hole; 135—fitting groove; 141—first sleeve; 142—second sleeve; 143—limiting protrusion; 144—first stop portion; 145—limiting boss; 146—trstricting groove; 160—first sealing ring; 170—second sealing ring; 20—massage component; 210—flexible shell; 211—assembling holes; 212—receiving cavity; 213—limiting step; 220—first vibrator; 230—massage working end; 30—angle adjusting mechanism; 310—adjusting assembly; 311—elastic piece; 312—adjusting piece; 3121—adjusting pin; 3122—connecting column; 3123—adjusting end; 3124—annular protrusion; 320—adjusting fitting piece; 321—fitting portion; 3211—mounting hole; 3212—adjusting hole; 322—limiting portion; 324—connecting segment; 325—limiting segment; 326—first wiring channel; 327—second stop portion.

Realization of purposes, functional features, and advantages of the present disclosure is further explained in conjunction with embodiments and with reference to the accompanying drawings.

DETAILED DESCRIPTION

In order to make the purpose, technical solutions, and advantages of the present disclosure clear, the following section will further describe the embodiments of the present disclosure in detail with reference to the accompanying drawings.

When the following description refers to the drawings, the same numbers in different drawings refer to the same or similar pieces unless otherwise indicated. The implementations described in the following exemplary embodiments do not represent all implementations consistent with the present disclosure. Rather, they are merely examples of apparatus and methods consistent with certain aspects of the present disclosure, as detailed in the appended claims.

It should be understood in the description of the present disclosure that terms such as “first” and “second” are only used for the purpose of description, rather than being understood to indicate or imply relative importance or hint the number of indicated technical features. Thus, the feature limited by “first” and “second” can explicitly or impliedly comprise at least one feature. Unless otherwise indicated, the term “a plurality of” means two or more. The term “and/or” depicts the relationship between associated objects and there are three relationships thereon. For example, A and/or B may indicate A exists alone, A and B exist at the same time, and B exists alone. The character “/” generally indicates that the associated object is alternative. The terms “first”, “second”, “third”, etc. in the present disclosure are used only to distinguish similar objects and do not imply a specific ordering of objects.

Unless otherwise defined, all technical and scientific terms used herein have the same meaning as commonly understood by those skilled in the art of the present disclosure. The terminology used in the specification is for the purpose of describing specific embodiments only and is not intended to limit the present disclosure. As used herein, the term “and/or” comprises any and all combinations of one or more of the associated listed items.

With the fast pace of modern life and work, people often feel physically and mentally exhausted. Massaging the body through manual manipulation or with a therapeutic massage device not only helps promote blood circulation and relax muscle tissue, but also relieves stress and enhances comfort to some extent, offering excellent health and relaxation benefits. To meet growing market demands, various massagers are created. However, conventional massagers have limited functionality and are restrictive in certain applications. Furthermore, adjustment flexibility of the conventional massager is insufficient, resulting in a less than ideal level of comfort and effectiveness in actual use.

Therefore, one embodiment of the present disclosure provides a massager 1 to enhance sensory experience of massage. The massager 1 comprises a main body 10, a massage component 20, and an angle adjusting mechanism 30. The massager 1 of the embodiment is described in detail below with reference to the accompanying drawings.

Figure 2:
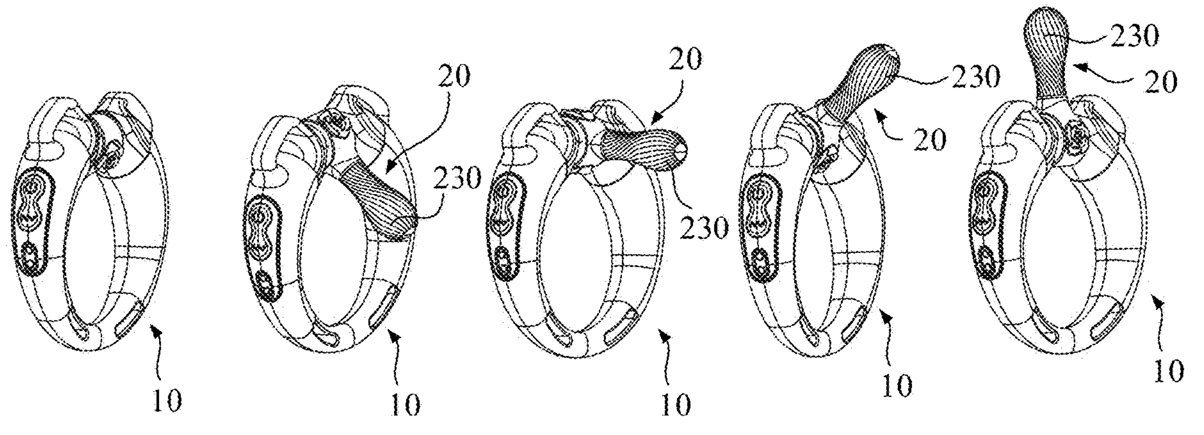
FIG. 2 is a schematic diagram showing that a massage component is rotatable relative to a main body.
Figure 3:
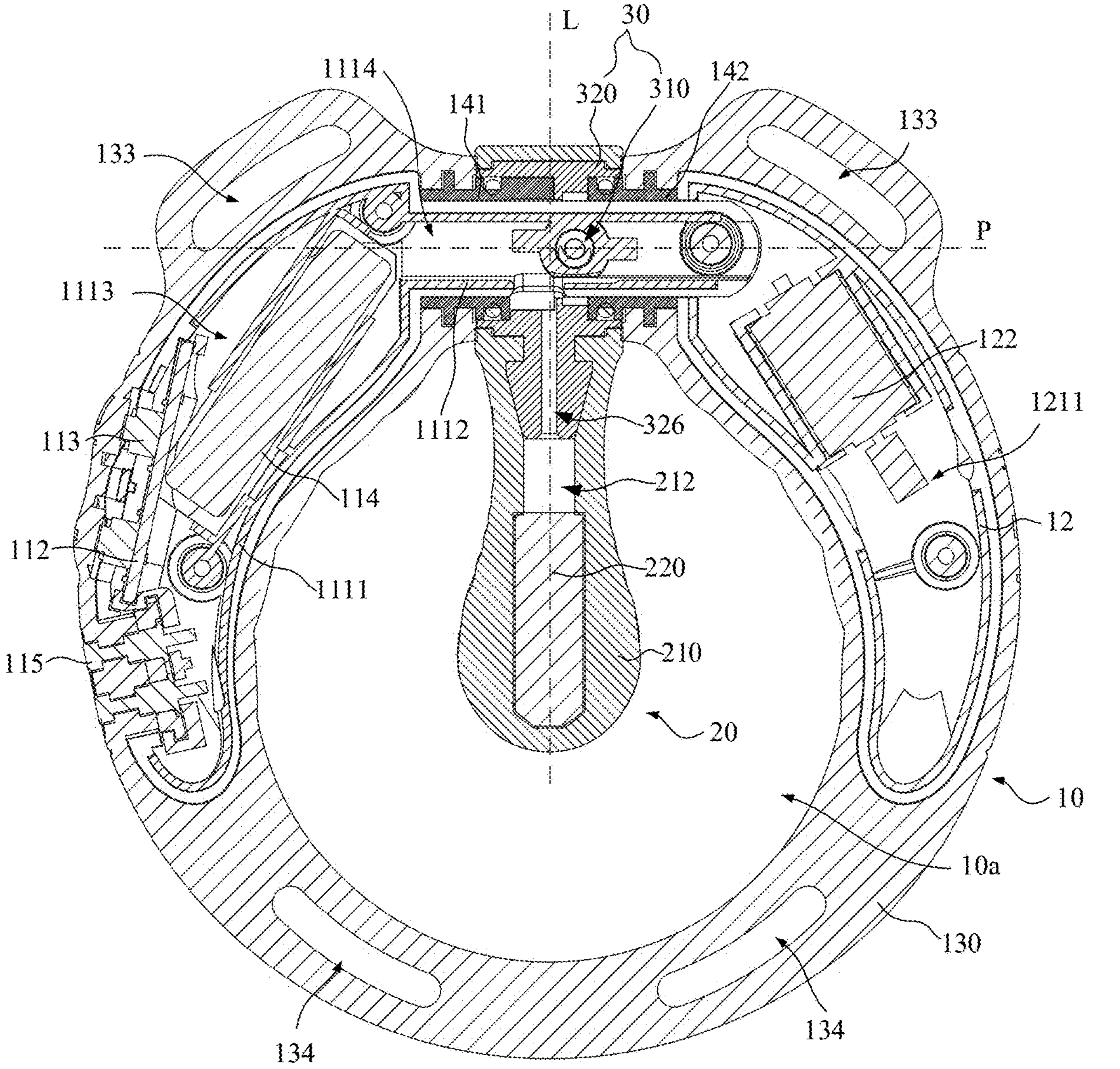
FIG. 3 is a cross-sectional schematic diagram of the massager according to one embodiment of the present disclosure.

FIGS. 1-3 are schematic diagrams of the massager 1 according to one embodiment of the present disclosure. In the embodiment, the main body 10 is disposed in a ring shape, which comprises, but is not limited to, a circular ring shape, an elliptical ring shape, or a rounded rectangular ring shape. A root of the massage component 20 is rotatably mounted to the main body 10. One end of the massage component 20 away from the root is defined as a massage working end 230. The angle adjusting mechanism 30 is disposed between the massage component 20 and the main body 10. The angle adjusting mechanism 30 is configured to adjust an angle of an extending axis L of the massage component 20 around a connecting axis P of the main body 10, so as to meet user needs.

Furthermore, the main body 10 is disposed in the ring shape, which means that the main body 10 is a continuous ring structure or a discontinuous ring structure with an opening.

As one implementation of the main body 10 disposed in the ring shape, the main body 10 is a ring structure with a central hole 10*a*. A connecting shaft 1112 is disposed on the main body 10, and the connecting shaft 1112 cooperates with a rest portion of the main body 10 to form the ring structure. The massage component 20 is rotatably mounted on the connecting shaft 1112, and the angle adjusting mechanism 30 is disposed between the connecting shaft 1112 and the massage component 20.

In another implementation where the main body 10 is disposed in the ring shape, the main body 10 is the discontinuous ring structure with the opening. The connecting shaft 1112 is mounted on the massage component 20, and the massage component 20 is rotatably connected to the main body 10 via the connecting shaft 1112. The connecting shaft 1112 is connects to two opposite ends defining the opening of the main body 10. That is, the connecting shaft is disposed in the opening and is connected to the main body 10 to form the ring structure with the central hole 10*a*. Similarly, the connecting shaft 1112 may be mounted on the angle adjusting mechanism 30, and the angle adjusting mechanism 30 is connected to the main body 10 through the connecting shaft 1112 to form the ring structure.

Figure 14:
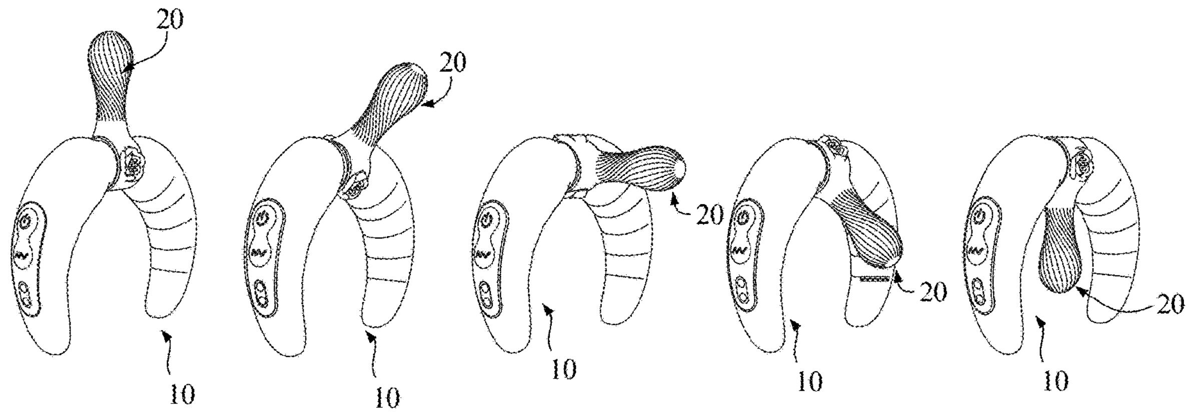
FIG. 14 is another cross-sectional schematic diagram of the massager according to another embodiment of the present disclosure.

Based on the above two implementations, as shown in FIG. 14, an opening is defined on one side of the main body 10 away from the connecting shaft 1112. An arrangement of the connecting shaft 1112 may refer to any of the aforementioned implementations. In the embodiment, the main body 10 forms two gripping portions on two opposite sides of the massage component 20. The user is able to hold one of the gripping portions with one hand or hold the two gripping portions with both hands, thus the main body 10 is configured as an ergonomic U-shaped handle.

It should be noted that the connecting axis P around which the massage component 20 rotates is a geometric center line of the connecting shaft 1112. For ease of illustration, the connecting axis P is shown as a dot-dashed line in the drawings.

Figure 15:
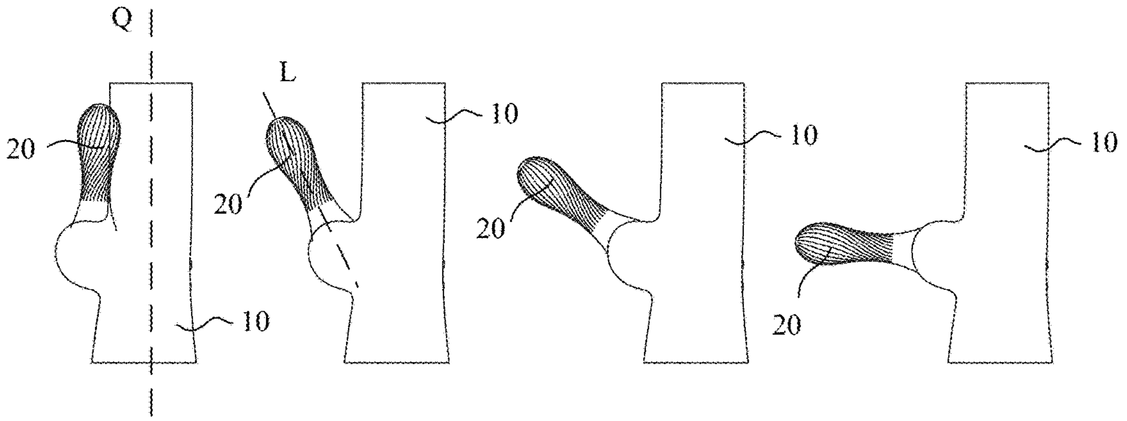
FIG. 15 is another cross-sectional schematic diagram of the massager according to another embodiment of the present disclosure.

FIG. 15 is another cross-sectional schematic diagram of the massager according to another embodiment of the present disclosure. As shown in FIG. 15, the main body 10 is disposed in a column shape and is divided into a gripping portion and a massage portion along a length direction thereof. A root of the massage component 20 is rotatably mounted between the gripping portion and the massage portion. That is, the massage component 20 is generally located in a middle portion of the main body 10. The connecting axis P (perpendicular to a horizontal plane) between the massage component 20 and the main body 10 is substantially perpendicular to an extending axis Q of the main body 10. In the embodiment, “substantially perpendicular” is understood as that the angle between the connecting axis P and the extending axis Q is 90°±15°.

Furthermore, in the embodiment where the main body is in the column shape, a rotating connecting structure thereof is described as follows.

In one embodiment of the main body in the column shape, the main body 10 comprises the connecting shaft 1112. Specifically, two ends of the connecting shaft 1112 are fixed to the middle portion of the main body 10 and are substantially perpendicular to the extending axis Q of the main body 10. The root of the massage component 20 is sleeved on the connecting shaft 1112 and is rotatable around the connecting shaft 1112. The angle adjusting mechanism 30 is disposed between the massage component 20 and the connecting shaft 1112 (or the main body 10) to adjust and fix a rotation angle of the massage component 20.

In another embodiment of the main body in the column shape, the connecting shaft 1112 is directly disposed on the root of the massage component 20. The massage component 20 is rotatably connected to a bearing seat or shaft hole disposed on the middle portion of the main body 10 via the connecting shaft 1112. In this case, the angle adjusting mechanism 30 is configured to adjust the rotation angle of the massage component 20 and the connecting shaft 1112 of the massage component 20 relative to the main body 10.

Similarly, the connecting shaft 1112 is alternatively disposed on the angle adjusting mechanism 30. When the angle adjusting mechanism 30 is operated, an output shaft thereof (i.e., the connecting shaft 1112) directly drives the massage component 20 to rotate around the connecting axis P of the output shaft.

The angle adjusting mechanism 30 realizes angle adjustment and fixation through mechanical cooperation, a driving motor, a rotating motor, or other driving source, which is not limited thereto. In this way, the angle adjustment between the massage component 20 and the main body 10, is realized.

In the massager 1 of the present disclosure, the angle adjusting mechanism 30 enables the user to adjust the rotation angle of the massage component 20 relative to the main body 10. The user is able to flexibly adjust an angle of the massage working end 230 of the massage component 20 according to personal usage habits or contours of different parts of the human body, thereby improving the fit and comfort of the massage. Furthermore, the user is able to hold the main body 10 to massage a target muscle group or acupoints of the human body with the massage component 20. Specifically, when the main body 10 is in the ring shape, the main body 10 is allowed to be sleeved on a specific organ or fixed to an external support, thereby realizing hands-free massage. When the main body 10 is in the column shape, the main body 10 itself constitutes the ergonomic U-shaped handle, facilitating precise application of force. Different embodiments of the main body are adapted to different usage scenarios, which improve flexibility and convenience of use.

Figure 4:
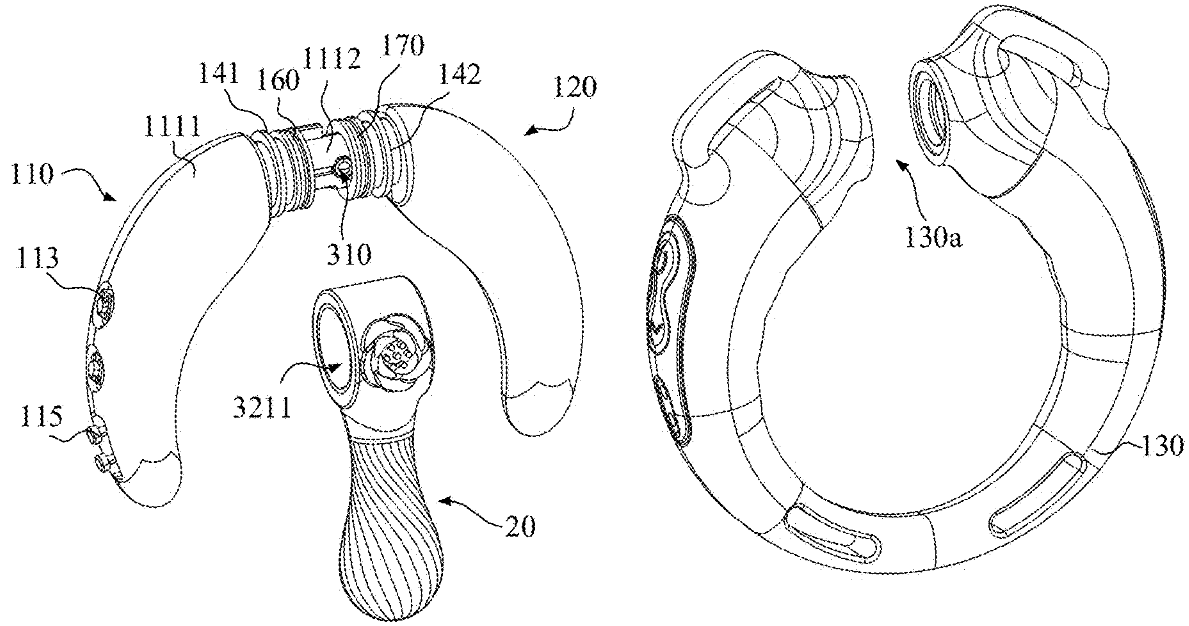
FIG. 4 is an exploded schematic diagram of the massager according to one embodiment of the present disclosure.
Figure 5:
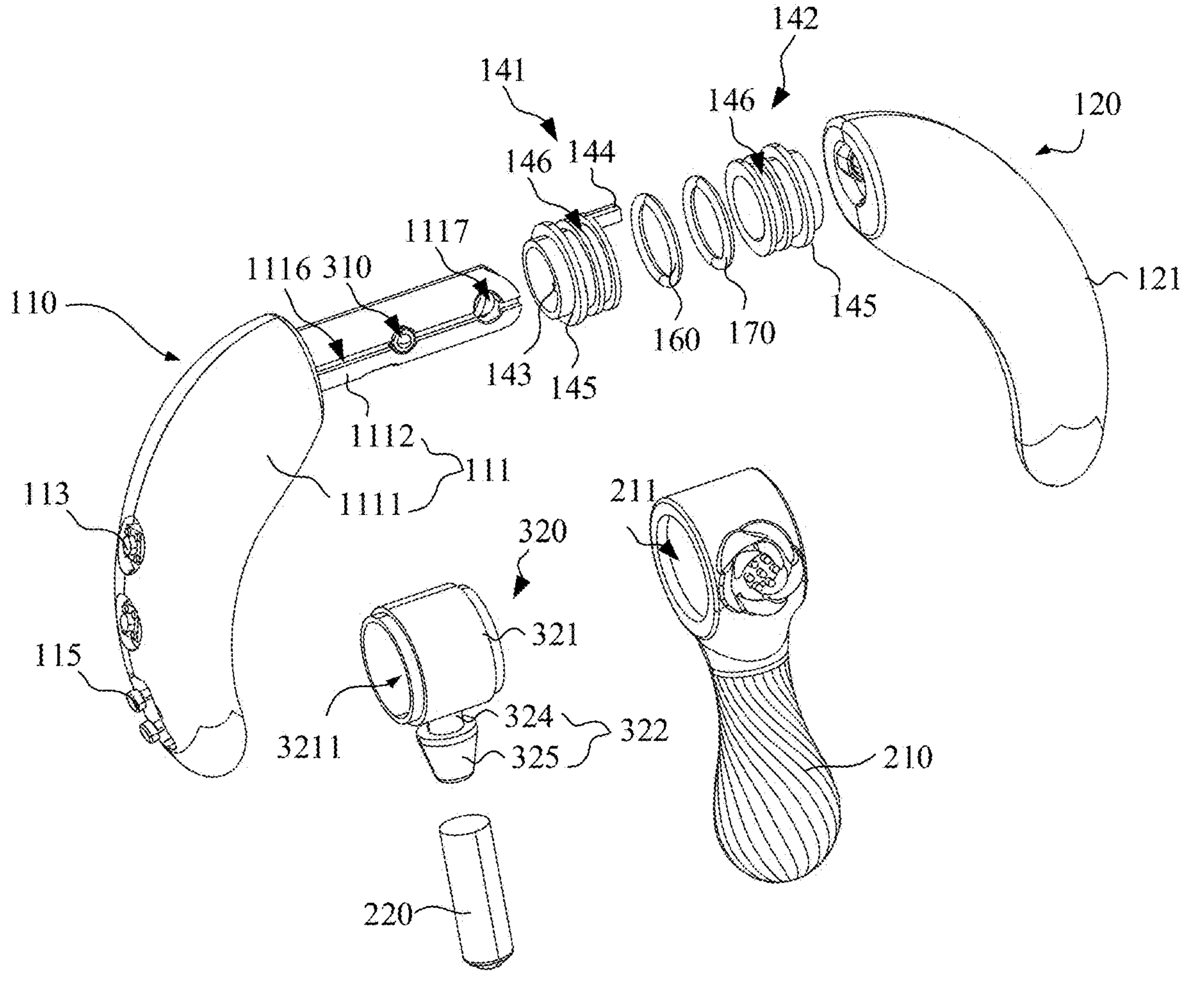
FIG. 5 is another exploded schematic diagram of the massager according to one embodiment of the present disclosure.

As shown in FIGS. 4 and 5, the main body 10 further comprises a first main body portion 110, a second main body portion 120, and a flexible outer housing 130. The first main body portion 110 comprises a first shell assembly 111, a control assembly 112, control buttons 113, and a power supply 114. The first shell assembly 111 comprises a mounting portion 1111 connected to the connecting shaft 1112. The mounting portion 1111 is arc-shaped and defines a first mounting cavity 1113 therein. The first mounting cavity 1113 is configured to accommodate the control assembly 112 and the power supply 114. A second wiring channel 1114 communicated with the first mounting cavity 1113 is defined in the connecting shaft 1112. The control buttons 113 are disposed on an outer surface of the mounting portion 1111 for easy user operation. The control buttons 113 are in a signal connection with the control assembly 112. The power supply 114 is configured to supply power to the first vibrator 220 and the control assembly 112. The receiving cavity 212 is connected to the first mounting cavity 1113 through the second wiring channel 1114. Thus, a power line 114 and a signal line that connect the first vibrator 220 sequentially enter the first mounting cavity 1113 through the first wiring channel 326 and the second wiring channel 1114. To facilitate charging of the power supply 114, the first main body portion 110 further comprises conductive pins 115 mounted on the first shell assembly 111. The conductive pins 115 are configured to connect the power supply 114 to an external power supply device.

As shown in FIGS. 4 and 5, the second main body portion 120 comprises a second shell assembly 121 and a second vibrator 122. The second shell assembly 121 is arc-shaped and is detachably connected to a free end of the connecting shaft 1112. After the first shell assembly 110 is connected and fixed to the second shell assembly 120, the first shell assembly 110 and the second shell assembly 120 do not form the continuous ring structure. The second shell assembly 121 defines a second mounting cavity 1211 therein. The second vibrator 122 is disposed in the second mounting cavity 1211. The second vibrator 122 is, for example, but not limited to, a vibration motor, a linear resonant driver, or a piezoelectric ceramic vibrating plate. The second vibrator 122 works to vibrate, which drives the second shell assembly 121 to vibrate accordingly. Then, a vibration of the second shell assembly is transmitted to the body surface of the user, thereby forming an effective massage effect. The power supply 114 is further configured to supply the power to the second vibrator 122. The second wiring channel 1114 is communicated with the first mounting cavity 1113 and the second mounting cavity 1211.

Figure 6:
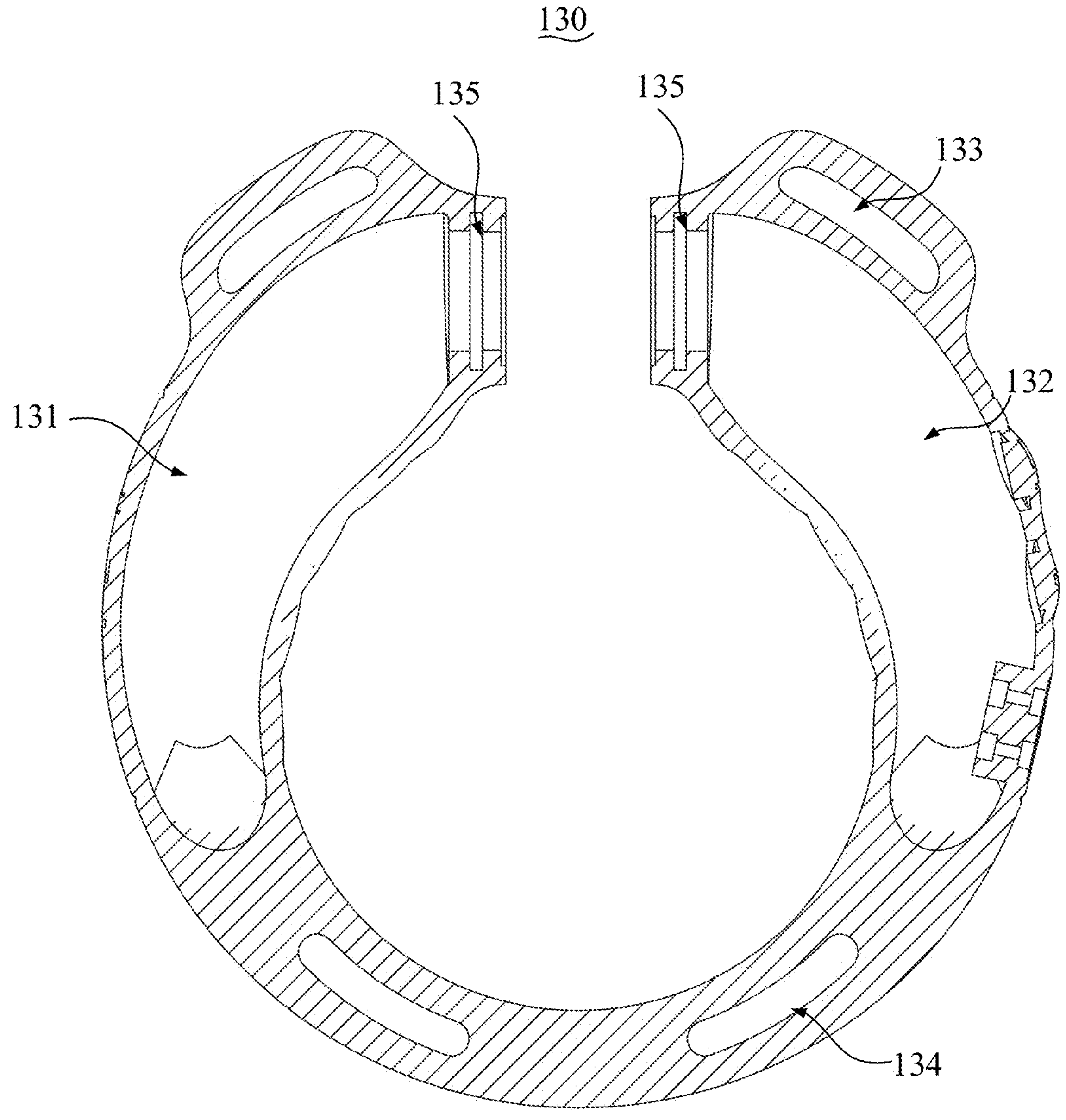
FIG. 6 is a cross-sectional schematic diagram of a flexible outer housing of the massager according to one embodiment of the present disclosure.

As shown in FIG. 6, the flexible outer housing 130 is an annular structure with a notch 130*a*. A first accommodating cavity 131 and a second accommodating cavity 132 are respectively formed at two opposite ends of the flexible outer housing 130. The mounting portion 1111 is accommodated in the first accommodating cavity 131. The connecting shaft 1112 extends from an opening of the first accommodating cavity 131. The second main body portion 120 is accommodated in the second accommodating cavity 132. The connecting shaft 1112 is exposed at the notch 130*a*, and together with the flexible outer housing 130, forms the continuous ring structure.

The first shell assembly 111 and the second shell assembly 121 are made from rigid plastics, such as Acrylonitrile Butadiene Styrene (ABS), Polycarbonate (PC)/ABS alloy, or reinforced Polypropylene (PP) engineering plastics. These materials have high mechanical strength, rigidity, and dimensional stability, providing a stable mounting base and reliable protection for internal electronic components. The flexible outer housing 130 can be made of flexible materials such as TPU, silicone, or soft PVC. These materials not only have good skin-friendliness and provide a comfortable massage experience, but their elasticity also allows them to tightly wrap around the rigid shell, forming a cushioning protection inside, while improving the product's appearance and overall quality. Furthermore, the aforementioned angle adjusting mechanism 30 and massage component 20 are both connected to the connecting shaft 1112.

As shown in FIGS. 3-5, the massage component 20 may comprise a flexible shell 210 and a first vibrator 220. The flexible shell 210 is rotatably mounted on the connecting shaft 1112 and has an internal receiving cavity 212. The first vibrator 220 is fixedly mounted in the receiving cavity 212. The first vibrator 220 may be, for example, but not limited to, a vibration motor, a linear resonant driver, or a piezoelectric ceramic vibrating plate. When the first vibrator 220 vibrates, the flexible shell 210 is driven to vibrate accordingly, thereby transmitting a vibrational force to the body surface of the user through the flexible shell, forming an effective massage effect. Therefore, a portion, contacting the body face, of the flexible shell 210 forms the massage working end 230. The flexible shell 210 encapsulates the first vibrator 220 within the receiving cavity 212, effectively protecting internal electronic components of the first vibrator 220 from external impacts or environmental corrosion. Further, the material properties of the flexible shell 210 realize efficient transmission of the vibrational force. The flexible shell 210 may be made of soft materials such as thermoplastic polyurethane (TPU), silicone, or soft polyvinyl chloride (PVC), which have excellent skin-friendliness.

Furthermore, a friction surface is defined on an outer surface of the portion of the flexible shell 210 forming the massage working end 230. A specific form of the friction surface comprises, but is not limited to, regular or irregular textures, such as wave patterns, grid patterns, or dot-matrix protrusions. Thus, when the flexible shell 210 vibrates and contacts the body surface of the user, protrusions and/or grooves of the friction surface avoid a "slipping" sensation caused by a smooth surface, increases the friction with the skin, ensures that the massage working end 220 stably attaches to the skin during vibration, and prevents ineffective sliding. Moreover, different textures provide users with differentiated sensory experiences, thereby meeting personalized needs.

Figure 7:
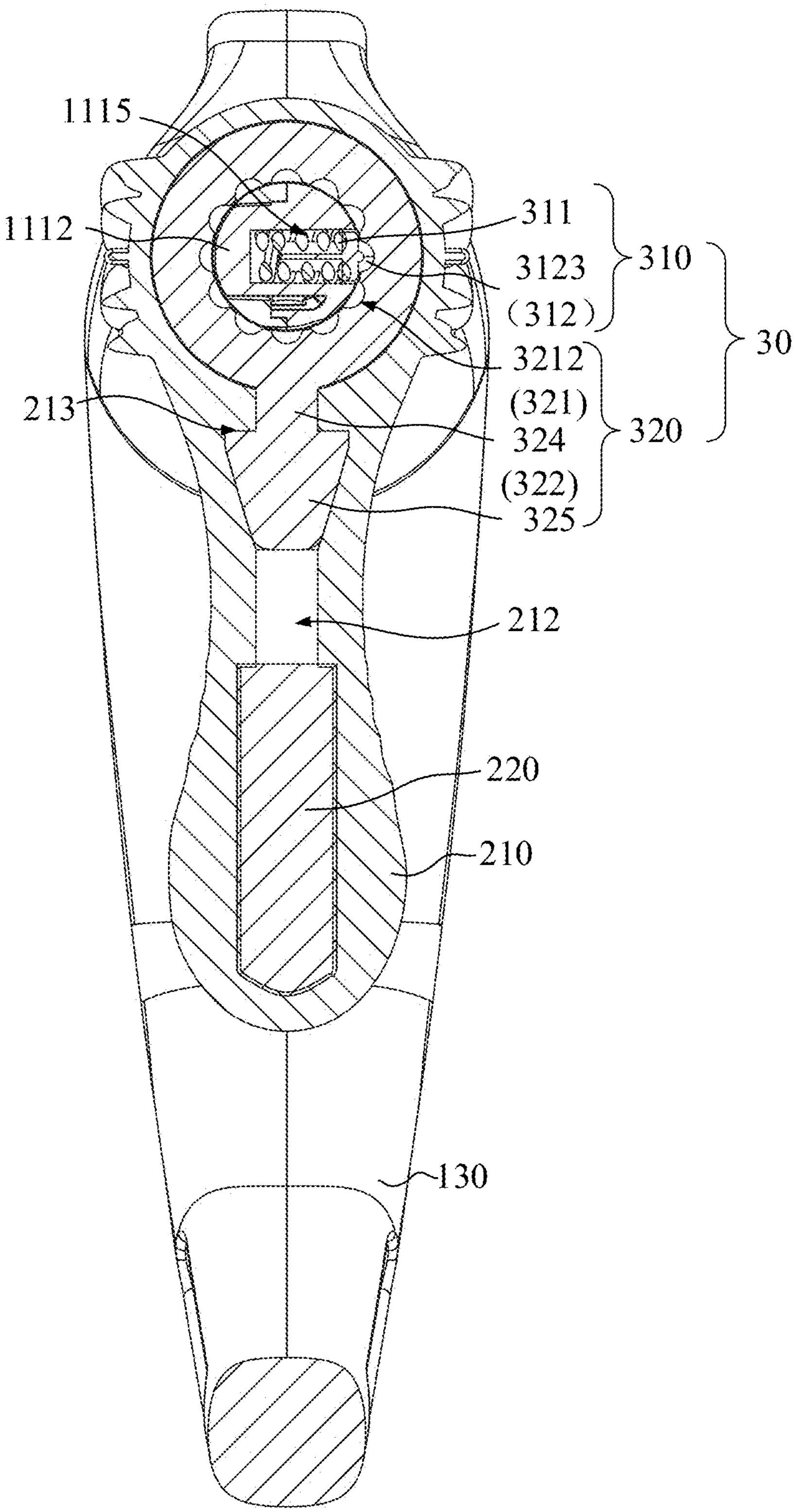
FIG. 7 is another cross-sectional schematic diagram of the massager according to one embodiment of the present disclosure.
Figure 8:
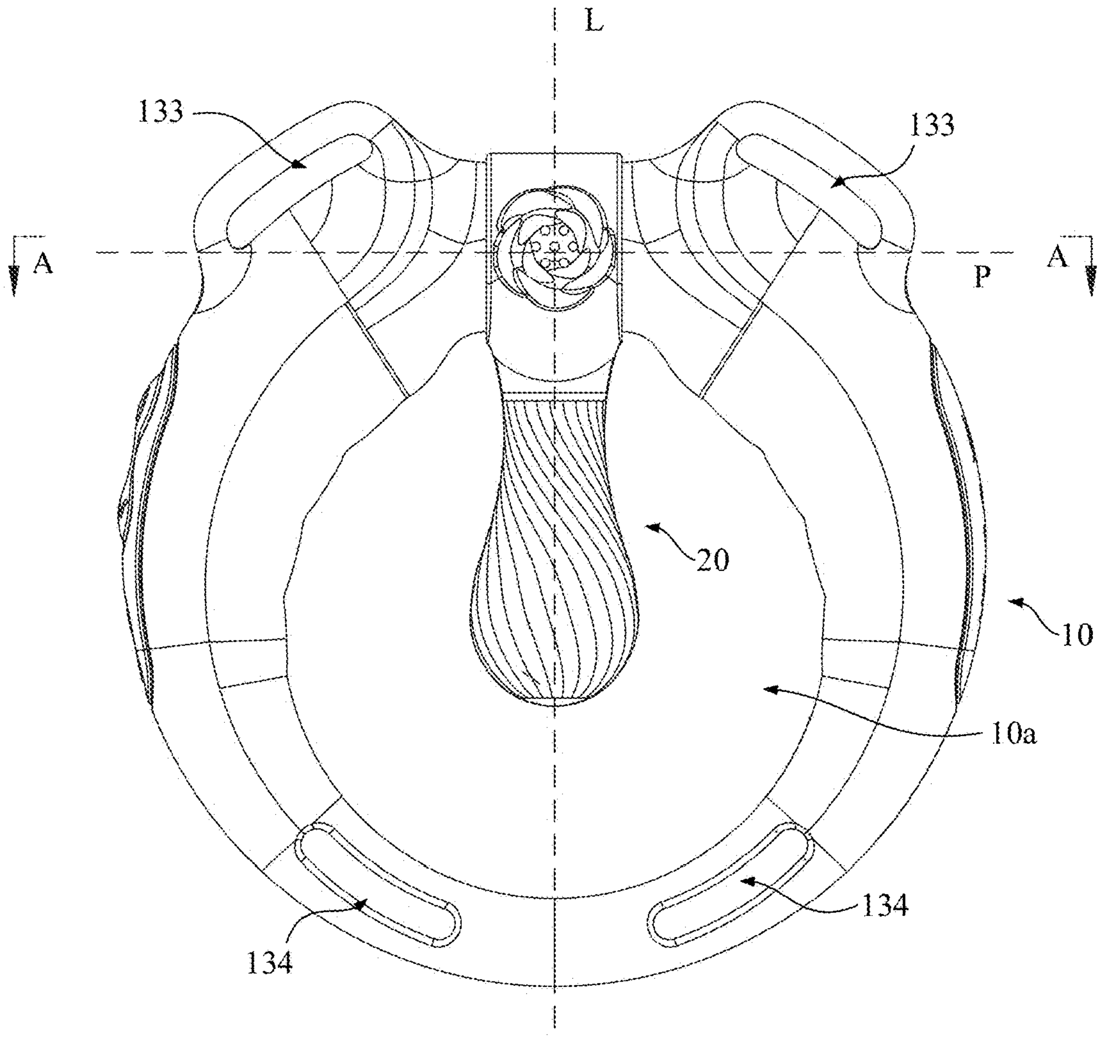
FIG. 8 is a front side elevational schematic diagram of the massager according to one embodiment of the present disclosure.

As shown in FIGS. 5 and 7, the angle adjusting mechanism 30 may comprise an adjusting assembly 310 and an adjusting fitting piece 320. The adjusting assembly 310 is disposed on the connecting shaft 1112 and comprises an elastic piece 311 and an adjusting piece 312 driven by the elastic piece 311. The adjusting fitting piece 320 is fixedly connected to the massage component 20 and is able to mechanically interact with the adjusting piece 312. When the user rotates the massage component 20, the massage component 20 drives the adjusting piece 320 to rotate relative to the main body 10. At this time, the adjusting piece 312, driven by the elastic piece 311, generates an interaction force with the adjusting piece 320. The interaction force is specifically manifested in the following two optional implementation methods.

In a first implementation, adjusting holes 3212 disposed at intervals are defined on a circumferential direction of the adjusting fitting piece 320. Under an action of an elastic force, the adjusting piece 312 axially or radially extends into one of the adjusting holes 3212. Such a "engagement-disengagement" mechanical action provides a clear sense of gear position during rotation and precisely fixes the massage component 20 at a predetermined angle, thereby realizing stepped adjustment.

In a second implementation, the adjusting piece 312 presses against a surface of the adjusting fitting 320 under the action of the elastic force, providing damping by generating sliding friction in an axial or a radial direction. Such a frictional torque is able to balance the external forces acting on the massage component 20, thereby stabilizing the massage component 20 at any angle and realizing stepless adjustment.

Figure 9:
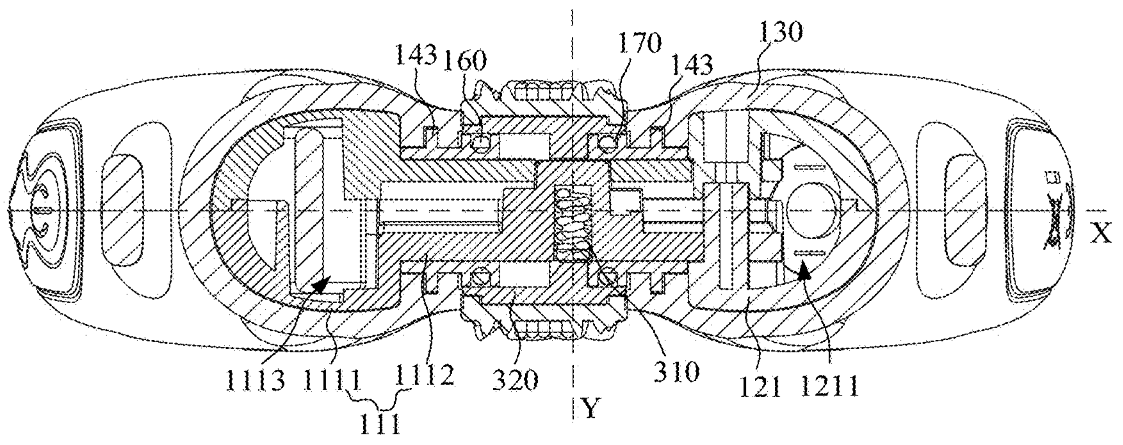
FIG. 9 is a cross-sectional schematic diagram of the massager taken along a line A-A shown in FIG. 8.

The axial direction refers to an axial direction of a rotating joint where the massage component 20 connects to the main body 10, the radial direction refers to a direction perpendicular to the axial direction, and the circumferential direction refers to a rotation direction around the axial direction. As shown in FIG. 9, the axial direction is an X direction and the radial direction is a Y direction.

Based on the above embodiments, the angle adjusting mechanism 30 has characteristics of simple structure and convenient operation. Angle adjustment is realized through mechanical engagement. Furthermore, the angle adjusting mechanism 30 is a mechanical structure that requires no electric drive, which reduces product costs and increases service life.

In some embodiments, as shown in FIG. 5, the adjusting fitting piece 320 comprises a mounting hole 3211. The adjusting fitting piece 320 is sleeved on the connecting shaft 1112 through the mounting hole 3211, which facilitates mounting of the adjusting fitting piece 320 on the main body 10.

In the stepped adjustment implementation of the present disclosure, the angle adjustment and positioning of the massage component 20 is realized by engaging one of the adjusting holes 3212 on the adjusting assembly 310 and the adjusting fitting piece 320.

Figure 11:
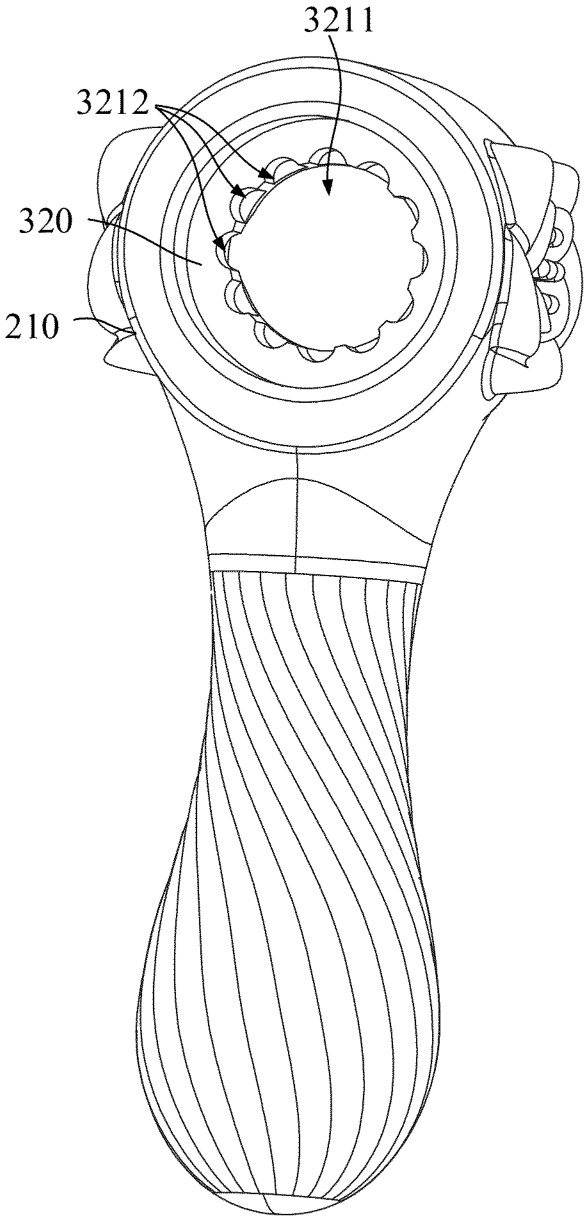
FIG. 11 is a schematic diagram of an adjusting fitting piece mounted on the massage component according to one embodiment of the present disclosure.

As shown in FIGS. 7, 9, and 11, in a radial engagement implementation, the adjusting holes 3212 are disposed on a hole wall of the mounting hole 3211. The adjusting holes 3212 are disposed at intervals along a circumferential direction of the mounting hole 3211. When the massage component 20 rotates around the main body, the adjusting piece 312 selectively extends into or disengages from any one of the adjusting holes 3212 along the radial direction under driving of the elastic piece 311, thereby adjusting and fixing the rotation angle of the massage component 20 relative to the main body 10. The elastic piece 311 may be a spring. In the embodiment, a movement direction (radial direction) of the adjusting piece 312 is perpendicular to the rotation axis of the massage component 20, which allows the entire angle adjusting mechanism 30 (including the elastic piece 311, the adjusting piece 312, and the adjusting fitting piece 320) to be compactly integrated in a radial space at a connection position between the massage component 20 and the main body 10, thereby reducing an overall axial dimension of the massager and realizing a miniaturized and lightweight design. When the adjusting piece 312 radially extends into one of the adjusting holes 3212, a force direction of the adjusting piece 312 is consistent with the axial direction of the adjusting holes 3212. A front insertion and withdrawal action of the adjusting piece 312 avoids generation of lateral forces or shear forces, making the engagement and disengagement of the adjusting piece 312 and any one of the adjusting holes 3212 smoother and more reliable, reducing wear, and effectively improving the service life of the adjusting piece and an adjustment feel.

In an axial engagement implementation, the adjusting assembly 310 and the adjusting fitting piece 320 are spaced apart along the axial direction of the connecting shaft 1112. The adjusting holes 3212 are defined on a side surface of the adjusting fitting piece 320 (i.e., an axial end face of the adjusting fitting piece 320) facing the adjusting assembly 310. The adjusting holes 3212 are disposed at intervals along a circumferential direction of the adjusting fitting piece 320. Driven by the elastic piece 311, the adjusting piece 312 selectively extends into or disengages from any one of the adjusting holes 3212 axially, thereby realizing stepped adjustment of the rotation angle of the massage component 20.

Figure 10:
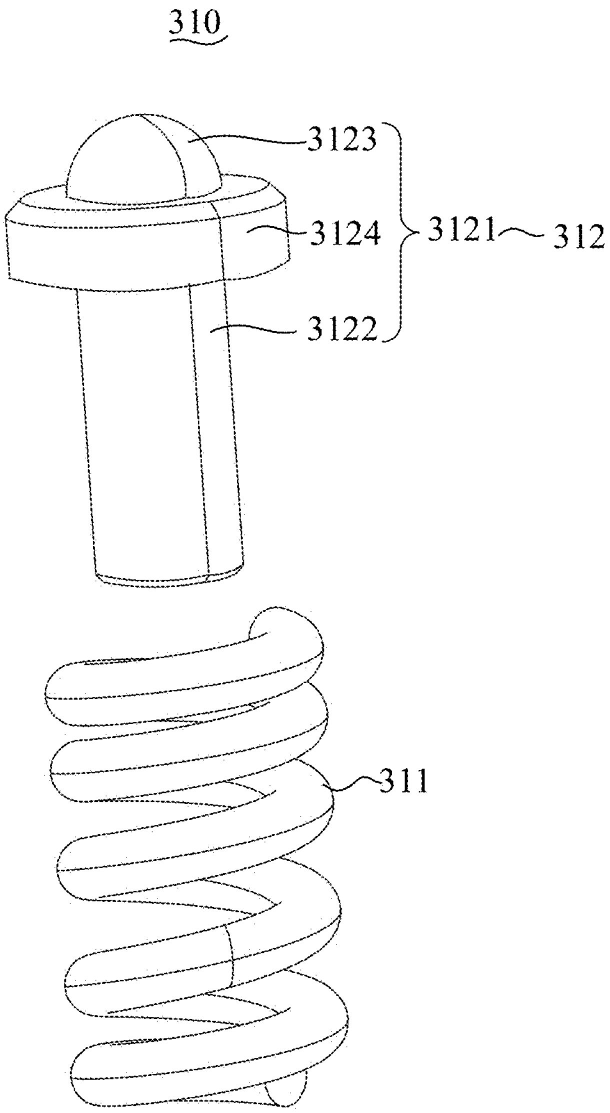
FIG. 10 is an exploded schematic diagram of an adjusting assembly according to one embodiment of the present disclosure.

In some embodiments, as shown in FIG. 10, the adjusting piece 312 is an adjusting pin 3121. A side surface of the adjusting pin 3121 is capable of extending into any one of the adjusting holes 3212. The side surface of the adjusting pin 3121 is a semi-spherical surface. A bottom wall of each of the adjusting holes 3212 is an arc surface matched with the side surface of the adjusting pin 3121. By such arrangements, the adjusting pin 3121 is able to smoothly insert into or disengage from any one of the adjusting holes 3212, thereby effectively reducing wear and operating noise. Furthermore, an arcuate contact manner helps to disperse stress and improves durability of the adjusting pin 3121 and the comfort of the hand feel.

In one specific embodiment, as shown in FIG. 10, the adjusting pin 3121 comprises a connecting column 3122, an adjusting end 3123, and an annular protrusion 3124. The connecting column 3122 is accommodated in the elastic piece 311. The adjusting end 3123 is connected to one end of the connecting column 3122 and is hemispherical. The annular protrusion 3124 is disposed between the connecting column 3122 and the adjusting end 3123. In the embodiment, the connecting column 3122 is accommodated in the elastic piece 311, so that the adjusting assembly 310 has a compact structure and a small axial dimension, which facilitates the miniaturization of the massager 1. Moreover, the connecting column 3122 effectively guides and limits the elastic piece 311, ensuring coaxiality and stability of the force applied to the elastic piece 311. One end of the elastic piece 311 abuts against the annular protrusion 3124 to drive the adjusting pin 3121 to move.

Based on the above embodiments, in an initial state, the adjusting end 3123 of the adjusting pin 3121, under the action of the elastic piece 311, engages in one of the adjusting holes 3212 of the adjusting fitting piece 320, thereby positioning the massage component 20 at a certain angle. When the user applies a rotational force to the massage component 20, the massage component 20 drives the adjusting fitting piece 320 to rotate around the main body 10. At this time, the hole wall of the one of the adjusting holes s3212 on the adjusting fitting piece 320 applies a lateral force to the adjusting end 3123, overcoming the elastic force of the elastic piece 311 and forcing the adjusting pin 3121 to retract axially, causing the adjusting end 3123 to disengage from the one of the adjusting holes 3212. As the massage component 20 continues to rotate, when the adjusting end 3123 engages in a next adjacent one of the adjusting holes 3212 under the action of the elastic piece 311, the massage component 20 is positioned at a new angle. By repeating the above process, the massage component 20 is cyclically adjusted between different gears.

In a stepless adjustment implementation of the present disclosure, the angle adjusting mechanism 30 works based on a principle of friction damping and realizes smooth and continuous angle adjustment through either radial or axial mating configurations. In the radial engagement implementation, driven by the elastic piece 311, an outer working surface of the adjusting piece 312 continuously presses against an inner wall of the mounting hole 3211 of the adjusting fitting piece 320. When the massage component 20 rotates, the adjusting piece 312 and the mounting hole 3211 generate uniform sliding friction damping, thereby realizing stepless positioning of the massage component 20 at any angle. By such arrangements, the friction pair is defined in the radial space, leading to a compact structure that is beneficial for controlling the axial dimensions of the massager.

In an axial mating configuration, the elastic piece 311 and the adjusting piece 312 are slidably disposed in the axial direction of the connecting shaft 1112 and are relatively fixed relative to the connecting shaft 1112 in the circumferential direction. Both the elastic piece 311 and the adjusting piece 312 are annular discs and are sleeved on the connecting shaft 1112. The elastic piece 311 may be one or more elastic sheets. The adjusting piece 312 comprises a first surface facing the adjusting fitting piece 320, and the adjusting fitting piece 320 comprises a second surface facing the adjusting piece 312. The first surface of the adjusting piece 312 contacts the second surfaces of the adjusting fitting piece 320, so as to provide the damping force during the rotation of the massage component 20 with respect to the main body 10.

To facilitate adjustment of the damping force between the adjusting piece 312 and the adjusting fitting piece 320, the massager may further comprise a threaded piece. The threaded piece defines an internal thread, and the connecting shaft 1112 comprises an outer thread. The internal thread of the threaded piece is screwed with the outer thread and is movable axially on the connecting shaft 1112. The threaded piece is configured to apply a pressure to the elastic piece 311. The threaded piece is moved by rotating, and by moving the threaded piece, the pressure between the elastic piece 311 and the adjusting piece 312 is adjusted, thereby adjusting the damping force between the adjusting piece 312 and the adjusting fitting piece 320.

In other embodiments, the angle adjusting mechanism 30 may be a damping ring made of a material such as silicone or rubber. The damping ring provides the damping force during the rotation of the massage component 20 and the main body 10, so as to position the massage component 20 at an adjusted angle after rotation. However, the present disclosure does not limit a specific form of the angle adjusting mechanism 30.

In some embodiments, the massage component 20 is configured such that the extending axis L thereof is approximately perpendicular to the connecting axis P of the connecting shaft 1112 at a connecting point thereof. In the embodiment, "substantially perpendicular" is understood as that the angle between the extending axis L of the massage component 20 and the connecting axis P of the main body 10 at the connection point is 90° #15°. Therefore, the massage working end 230 of the massage component 20 well contacts a body massage area, enabling more concentrated and effective transmission of vibration or pressure to the target muscle group or acupoints, and preventing interference between the massage component 20 and the main body 10 during rotation.

To facilitate the mounting of the massage component 20 and the adjusting fitting piece 320, as shown in FIG. 5, one end of the flexible shell 210 defines an assembling hole 211. The assembling hole 211 is communicated with the receiving cavity 212. The adjusting fitting piece 320 comprises a fitting portion 321 and a limiting portion 322. The fitting portion 321 is embedded in the assembling hole 211. The limiting portion 322 extends from the fitting portion 321 into the receiving cavity 212 to form a limiting fit with a cavity wall of the receiving cavity 212, thereby effectively preventing the adjusting fitting piece 320 from detaching from the flexible shell 210. The limiting portion effectively distributes a radial tensile force generated during adjustment, improving a connection reliability between the adjusting fitting piece 320 and the flexible shell 210. The adjusting fitting piece 320 is made of rigid plastic, such as, but not limited to, engineering plastics like PP, ABS, PC, or nylon. The rigid plastic provides sufficient structural strength and wear resistance to ensure the durability of the angle adjusting mechanism 30 during repeated use. In addition, rigidity of the rigid plastic enables the adjusting fitting piece 320 to form a stable and reliable interference fit with the flexible shell 210, which effectively prevents loosening and detachment caused by long-term vibration or external forces, while ensuring assembly accuracy and transmission stability.

As shown in FIG. 3, the limiting portion 322 defines a first wiring channel 326. The first wiring channel 326 is communicated with the mounting hole 3211 and the receiving cavity 212. The first wiring channel 326 provides an orderly and protected wiring path for the power line and the signal line of the first vibrator 220, so as to prevent the power line and the signal line from wear and help to maintain the cleanliness and sealing of structures in the limiting portion.

As shown in FIGS. 3, 5, and 7, the limiting portion 322 comprises a connecting segment 324 and a limiting segment 325. A first end of the connecting segment 324 is connected to the fitting portion. The limiting segment 325 is connected to a second end of the connecting segment 324 away from the fitting portion. A step structure is formed between the limiting segment 325 and the connecting segment 324. A limiting step 213 corresponding to the step structure is formed on the cavity wall of the receiving cavity. The limiting segment 325 abuts against the limiting step 213. After assembly, the limiting segment 325 abuts against the limiting step 213 of the cavity wall of the receiving cavity via the step structure, thereby realizing reliable axial limiting and effectively preventing the adjusting fitting piece 320 from dislodging from the flexible shell 210.

As shown in FIGS. 3, 5, and 7, in some embodiments, the limiting segment 325 is configured as a tapered structure with an outer diameter thereof gradually decreasing away from the connecting segment 324. In this way, the limiting segment 323 is configured as a guide during assembly, making it easier and smoother for the limiting segment 325 to be inserted into the receiving cavity 212, reducing assembly difficulty, improving production efficiency, and further protecting an inner wall of the flexible shell 210 from damage.

Figure 13:
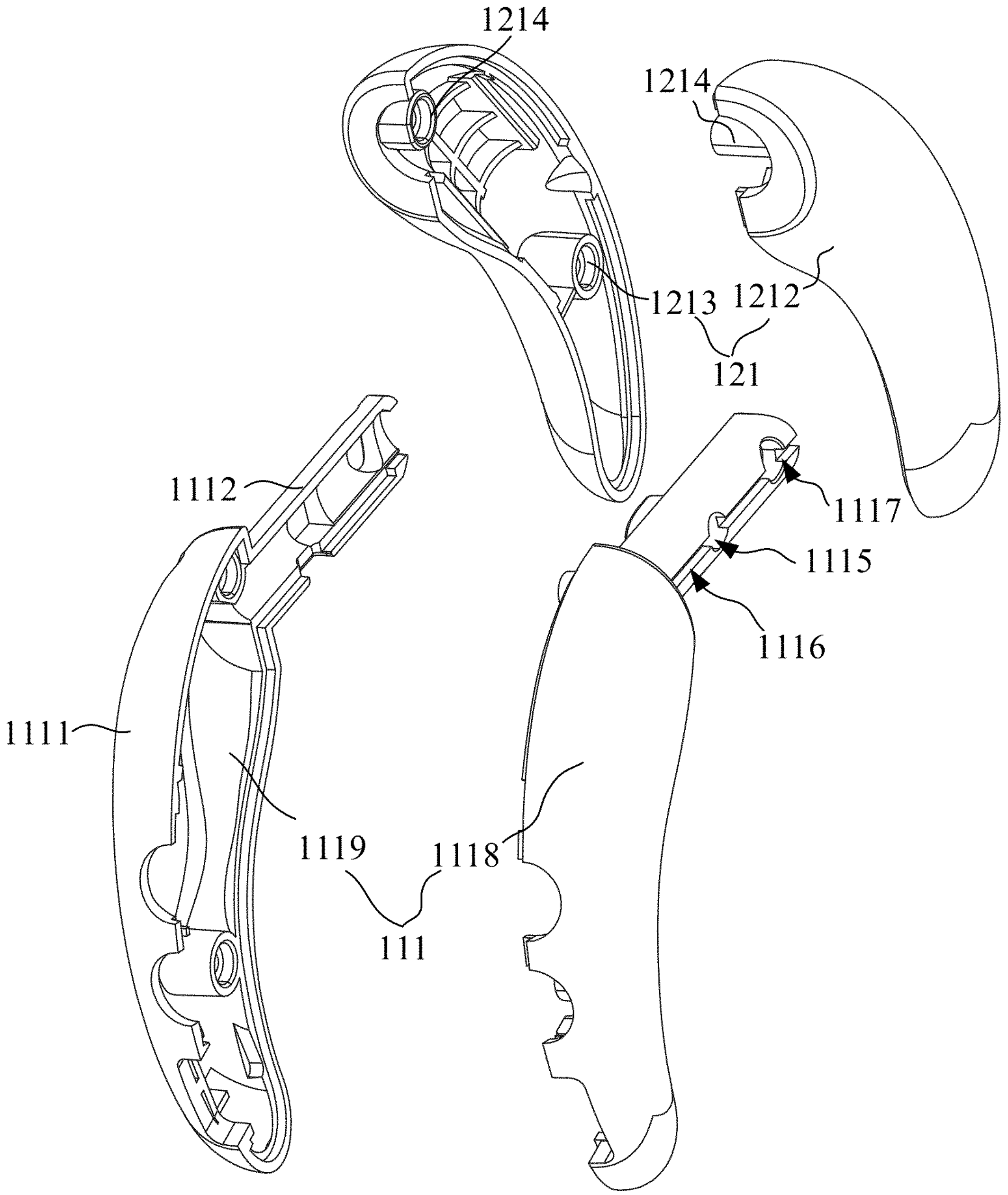
FIG. 13 is an exploded schematic diagram of a first shell assembly and a second shell assembly according to one embodiment of the present disclosure.

To facilitate mounting of the adjusting assembly 310 on the connecting shaft 1112, as shown in FIGS. 4 and 13, the connecting shaft 1112 comprises a mounting groove 1115. The adjusting assembly 310 is mounted in the mounting groove 1115. The adjusting end 3123 of the adjusting piece 312 extends from an opening of the mounting groove 1115 and is connected to the adjusting fitting piece 320. The mounting groove 1115 provides a stable accommodating space for the adjusting assembly 310, ensuring that the adjusting assembly 310 does not shift during operation. The mounting groove further makes an overall structure of the massager more compact, thereby reducing the radial dimension of the massager 1.

As shown in FIG. 13, in some embodiments, the first shell assembly 111 comprises a first shell 1118 and a second shell 1119. The first shell 1118 and the second shell 1119 are fixedly enclosed in a front-rear direction. The first shell 1118 forms a front half portion of the mounting portion 1111 and the connecting shaft 1112. The and the second shell 1119 forms a rear half portion of the mounting portion 1111 and the connecting shaft 1112. The front half portion of the connecting shaft 1112 on the first shell 1118 defines the mounting groove 1115.

In the embodiment, the mounting groove 1115 is integrally formed directly on the first shell 1118, which avoids structural weakening that may be caused by slotting at a joint and improves rigidity and durability of the mounting groove 1115 thereby enhancing the stability and reliability of the adjusting assembly 310 mounted in the mounting groove. The first shell 1118 and the second shell 1119 are connected in the front-rear direction by various methods such as screw connection or snap-fit connection. In this way, electronic components, such as the control assembly 112 and power supply 114, are pre-mounted in the first shell 1118 or the second shell 1119 before assembling the first shell and the second shell, which greatly simplifies an assembly process of internal components and improves production efficiency. In addition, the mounting portion 1111 and the connecting shaft 1112 on the first shell 1118 or the second shell 1119 may be integrally formed by injection molding or hot pressing, so that there are no splicing gaps or connection interfaces between the mounting portion 1111 and the connecting shaft 1112. The mounting portion 1111 and the connecting shaft 1112 form a complete rigid structure, which has extremely high structural integrity and eliminates an additional assembly process of connecting the mounting portion 1111 and the connecting shaft 1112, thereby effectively improving production efficiency.

As shown in FIG. 13, in some embodiments, the second shell assembly 121 comprises a third shell 1212 and a fourth shell 1213. The third shell 1212 and the fourth shell 1213 are fixed together in the front-rear direction. The third shell 1212 and the fourth shell 1213 are connected in the front-rear direction by various methods such as the screw connection or the snap-fit connection. In this way, the second vibrator 122 is able to be pre-mounted in the third shell 1212 or the fourth shell 1213 before the second shell assembly 121 is assembled. In addition, it facilitates mounting of the second shell assembly 121 and the connecting shaft 1112. Specifically, one end of the connecting shaft 1112 away from the mounting portion 1111 defines a mating hole 1117. Inserting portions are respectively disposed on an inner side of the third shell 1212 and an inner side of the fourth shell 1213. The third shell 1212 and the fourth shell 1213 are enclosed and fixed to the one end of the connecting shaft 1112. The inserting portions 1214 of the third shell 1212 and the fourth shell 1213 are respectively inserted from front and rear ends of the mating hole 1117 and then connected to each other. The inserting portions 1214 comprise threaded holes. After fixing a screw in the threaded holes, the third shell 1212 and the fourth shell 1213 are connected, and a mounting operation of the third shell 1212 and the fourth shell 1213 with the connecting shaft 1112 is completed.

To improve sealing performance of the massager 1, as shown in FIGS. 3-5, in some embodiments, the main body 10 further comprises a first sleeve 141 and a second sleeve 142. The first sleeve 141 is sleeved on the connecting shaft 1112 and disposed on a first side of the massage component 20. Two ends of the first sleeve form sealing interfaces. A first end of the first sleeve 141 is sealed to an edge of an opening of the first accommodating cavity 131 of the flexible outer housing 130. A second end of the first sleeve 141 extends into the mounting hole 3211 of the adjusting fitting piece 320, thereby forming a dynamic sealing fit with an outer peripheral wall of the adjusting fitting piece 320. Similarly, the second sleeve 142 is disposed on the second side of the massage component 20 in the same manner. A first end of the second sleeve is connected to an edge of an opening of the second accommodating cavity 132. A second end of the second sleeve fits with the adjusting fitting piece 320, The first sleeve 141 and the second sleeve 142 are configured as a sealing bridge connecting the flexible outer housing 130 and the core rotating component (i.e., the adjusting fitting piece 320), isolating the openings of the two accommodating cavities from the external environment and forming a sealing barrier.

To further enhance sealing reliability, especially to prevent sweat or moisture from intruding through a mating gap between the two sleeves (i.e., the first sleeve 141 and the second sleeve 142) and the adjusting fitting piece 320 under vibration conditions, as shown in FIGS. 3-5, the massager further comprises a first sealing ring 160 and a second sealing ring 170. The first sealing ring 160 is disposed at a mating interface between the first sleeve 141 and the adjusting fitting piece 320, and the second sealing ring 170 is disposed at a mating interface between the second sleeve 142 and the adjusting fitting piece 320. When the massage component 20 rotates, the sealing rings maintain sliding contact with the outer peripheral wall of the adjusting fitting piece 320, forming a tight elastic sealing layer. The sealing rings are made of materials such as silicone or rubber.

To improve connection stability and sealing performance between the two sleeves and the flexible outer housing 130, as shown in FIG. 5, limiting bosses 145 are disposed on both of an outer peripheral wall of the first sleeve 141 and an outer peripheral wall of the second sleeve 142. Correspondingly, fitting grooves are defined on an inner wall of the opening of the first accommodating cavity 131 and an inner wall of the opening of the second accommodating cavity 132 of the flexible outer housing 130. Shapes of the fitting grooves are matched with the limiting bosses 145. During assembly, the limiting bosses 145 are embedded in the fitting grooves 135, forming a reliable axial limit, which effectively prevents the two sleeves from separating from the flexible outer housing 130 during use.

Moreover, to improve the installation stability of the sealing rings, as shown in FIG. 5, restricting grooves 146 are defined on an outer peripheral wall of one end of the first sleeve 141 connected to the adjusting fitting piece 320 and an outer peripheral wall of one end of the second sleeve 142 connected to the adjusting fitting piece 320. The restricting grooves 146 are annular. The first sealing ring 160 and the second sealing ring 170 are respectively accommodated in the restricting grooves 146 and partially extend outward, so that the two sleeves are continuously and stably maintain elastic contact with the inner wall of the mounting hole 3211 of the adjusting fitting piece 320. The restricting grooves 146 effectively prevent the two sealing rings from shifting or falling off during long-term use or under vibration, thereby ensuring the long-term reliability of the dynamic seal.

As shown in FIGS. 5 and 13, in some embodiments, a limiting groove 1116 extending along an axial direction is formed on an outer surface of the connecting shaft 1112. Limiting protrusions 143 are respectively disposed on an inner wall of the first sleeve 141 and an inner wall of the second sleeve 142. After assembly, the limiting protrusions 143 are embedded in the limiting groove 1116 to form a keyway fit. The limiting protrusions 143 are matched with the limiting groove 1116 to prevent the first sleeve and the second sleeve from rotating in the circumferential direction relative to the connecting shaft 1112, thereby ensuring reliability of the connection between the two sleeves and the main body 10.

Figure 12:
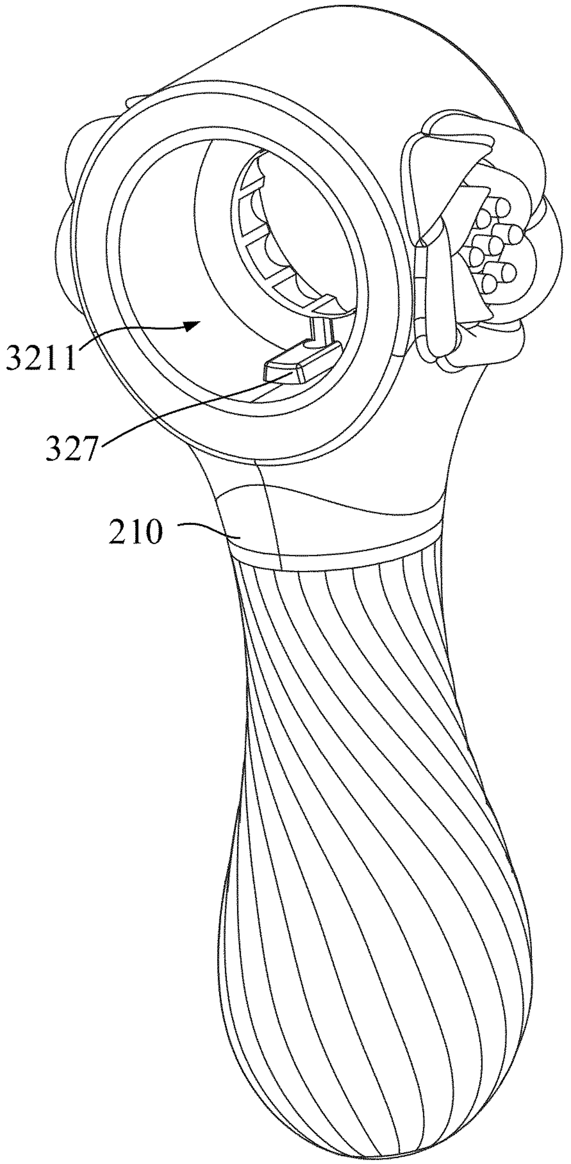
FIG. 12 is another schematic diagram of the adjusting fitting piece mounted on the massage component according to one embodiment of the present disclosure.

As shown in FIG. 5, a first stop portion 144 is disposed on one of the first sleeve 141 and the second sleeve 142. For instance, the first sleeve 141 comprises the first stop portion 144. As shown in FIG. 12, a second stop portion 327 is disposed on a hole wall of the mounting hole 3211 of the adjusting fitting piece 320. A range of the rotation angle of the massage component 20 relative to the connecting shaft 1112 is defined by a relative position of the first stop portion 144 in contact with the second stop portion 327. Specifically, when the massage component 20 rotates around the connecting shaft 1112, the rotation angle is limited by a contact position of the first stop portion 144 and the second stop portion 327, which prevents the massage component 20 from rotating 360 degrees, thereby avoiding a risk of internal connecting lines (e.g., the power line and the signal line) being twisted off or pulled out due to the infinite rotation of the massage component 20, thus ensuring the reliability and safety of the electrical connection.

Based on the above embodiments, an assembly process of the massager 1 is as follows. First, components of the first main body portion 110 are assembled in advance, and the adjusting fitting piece 320 is independently assembled with the massage component 20. Then, the first sleeve 141 and the adjusting assembly 310 are sequentially sleeved on the connecting shaft 1112. The adjusting fitting piece 320 already assembled with the massage component 20 is mounted on the connecting shaft, and then the second sleeve 142 is sleeved on the connecting shaft to form a core rotating module. Next, the third shell 1212 and the fourth shell 1213 of the second main body portion 120 are enclosed and fixed at the free end of the connecting shaft 1112. Finally, two ends of the flexible outer housing 130 are respectively sleeved on the mounting portion 1111 of the first main body portion 110 and the first main body portion 110 to complete the assembly process.

To improve wearability and ease of use of the massager 1, as shown in FIGS. 3 and 6, in some embodiments, the flexible outer housing 130 comprises two first connecting holes 133 protruding outward from two opposite end portions close to the massage component 20. The two first connecting holes 133 are located on two opposite sides of the massage component 20. The flexible outer housing 130 further comprises two second connecting holes 134 on one side thereof away from the massage component 20. The two second connecting holes 134 are located on the two opposite sides of the massage component 20. The two first connecting holes 133 and the two second connecting holes 134 are symmetrically disposed relative to the extending axis L of the massage component 20. In the embodiment, two independent flexible connecting straps or two flexible connecting cords are further provided. Two ends of a first flexible connecting strap are respectively connected to the two first connecting holes 133, and two ends of a second flexible connecting strap are respectively connected to the two second connecting holes 134. The user is able to flexibly choose a fixing method according to the usage scenario. By fixing the flexible connecting straps to any part of the body, the massage working end 230 of the massage component 20 is able to massage any part of the body.

In some embodiments, a circumferential outer diameter of the flexible outer housing 130 gradually decreases from a first end closer to the massage component 20 to a second end away from the massage component 20. Specifically, the first end of the flexible outer housing 130 closer to the massage component 20 needs to form a sufficiently accommodating cavity to accommodate internal rigid structures and electronic components such as the first shell assembly 111 and the second shell assembly 121. Furthermore, since the second end of the flexible outer housing 130 does not need to accommodate large components, the second end of the flexible outer housing 130 away from the massage component 20 has a smaller circumferential outer diameter, thereby realizing material savings and overall weight reduction.

In the drawings of the embodiments, the same or similar numbers correspond to the same or similar components. In the description of the present disclosure, it should be understood that terms such as "upper", "lower", "left", "right" etc. indicate direction or position relationships shown based on the drawings, and are only intended to facilitate the description of the present disclosure and the simplification of the description rather than to indicate or imply that the indicated device or piece must have a specific direction or constructed and operated in a specific direction. Therefore, the terms used to describe positional relationships in the drawings are only for illustrative purposes and cannot be construed as limitations of the present disclosure. For those of ordinary skill in the art, the specific meanings of the above terms can be understood according to specific circumstances.

The above are only optional embodiments of the present disclosure and are not intended to limit the present disclosure. Any modifications, equivalent substitutions, and improvements made within the spirit and principles of the present disclosure shall be comprised in the protection scope of the present disclosure.

What is claimed is:

1. A massager comprising:

a main body;

a massage component; and an angle adjusting mechanism;

wherein a root of the massage component is rotatably mounted on the main body;

wherein the angle adjusting mechanism is disposed between the massage component and the main body to adjust an angle of an extending axis of the massage component around a connecting axis of the main body;

wherein the main body is in a ring shape and has a connecting shaft, and the massage component is rotatably mounted on the connecting shaft;

wherein the angle adjusting mechanism comprises an adjusting assembly and an adjusting fitting piece;

wherein the adjusting assembly is disposed on the connecting shaft, and the adjusting assembly comprises an elastic piece and an adjusting piece driven by the elastic piece;

wherein the adjusting fitting piece is fixedly connected to the massage component and configured to interact with the adjusting piece;

wherein when the massage component rotates around the connecting shaft, a rotation angle of the massage component relative to the main body is adjusted by an interaction between the adjusting piece and the adjusting fitting piece;

wherein adjusting holes disposed at intervals are defined on a circumferential direction of the adjusting fitting piece;

wherein when driven by the elastic piece, the adjusting piece is configured to extend into any one of the adjusting holes, so as to position an adjusted angle of the massage component;

wherein the adjusting fitting piece comprises a mounting hole, the adjusting fitting piece is sleeved on the main body through the mounting hole, the adjusting holes are disposed on a hole wall of the mounting hole, and the adjusting holes are disposed at intervals along a circumferential direction of the mounting hole;

wherein when the massage component rotates around the main body, the adjusting piece selectively extends into or disengages from any one of the adjusting holes along a radial direction under driving of the elastic piece.

2. The massager according to claim 1, wherein when driven by the elastic piece, the adjusting piece abuts against a surface of the adjusting fitting piece to provide damping force during a rotation of the massage component and the main body.

3. The massager according to claim 1, wherein the adjusting piece comprises an adjusting pin, a side surface of the adjusting pin is capable of extending into any one of the adjusting holes, the side surface of the adjusting pin is a semi-spherical surface, and a bottom wall of each of the adjusting holes is an arc surface matched with the side surface of the adjusting pin.

4. The massager according to claim 1, wherein the massage component comprises a flexible shell and a first vibrator;

wherein the flexible shell comprises an assembling hole and a receiving cavity communicated with the assembling hole, wherein the assembling hole is configured to mount the adjusting fitting piece;

wherein the first vibrator is disposed in the receiving cavity, and the flexible shell is rotatably mounted to the main body through the adjusting fitting piece.

5. The massager according to claim 4, wherein the adjusting fitting piece comprises a fitting portion and a limiting portion;

wherein the fitting portion is embedded in the mounting hole and defines the mounting hole, the limiting portion is connected to the fitting portion and extends into the receiving cavity, and the limiting portion is attached to a cavity wall of the receiving cavity;

wherein the limiting portion comprises a first wiring channel communicated with the mounting hole and the receiving cavity.

6. The massager according to claim 5, wherein the limiting portion comprises: a connecting segment and a limiting segment;

wherein a first end of the connecting segment is connected to the fitting portion;

and the limiting segment is connected to a second end of the connecting segment away from the fitting portion;

wherein a step structure is formed between the limiting segment and the connecting segment, a limiting step corresponding to the step structure is formed on the cavity wall of the receiving cavity, and the limiting segment abuts against the limiting step.

7. The massager according to claim 1, wherein the main body comprises a first main body portion, a second main body portion, and a flexible outer housing;

wherein the first main body portion comprises the connecting shaft and a mounting portion connected to the connecting shaft, and the mounting portion is in an arc shape;

wherein the second main body portion is in an arc shape and is connected to one end of the connecting shaft away from the mounting portion;

wherein the flexible outer housing is a ring structure having a notch, two opposite ends of the flexible outer housing are respectively sleeved on the mounting portion and the second main body portion;

wherein the connecting shaft is exposed at the notch and forms a complete ring structure together with the flexible outer housing;

wherein the adjusting assembly is mounted on the connecting shaft, the adjusting fitting piece is sleeved on the connecting shaft and is matched with the adjusting assembly, and the massage component is rotatable around the connecting shaft through the adjusting fitting piece.

8. The massager according to claim 7, wherein a mounting groove, is formed on the connecting shaft, and the adjusting assembly is mounted on the mounting groove.

9. The massager according to claim 7, wherein the massage component comprises a flexible shell and a first vibrator disposed in a receiving cavity of the flexible shell;

wherein the first main body portion comprises a first shell assembly, a control assembly, control buttons, and a power supply;

wherein the first shell assembly comprises the mounting portion and the connecting shaft, the mounting portion defines a first mounting cavity, and the connecting shaft defines a second wiring channel communicated with the first mounting cavity;

wherein the control assembly is disposed in the first mounting cavity, the control buttons are disposed on a surface of the first shell assembly facing an outside, and the control buttons are in signal connection with the control assembly;

wherein the power supply is disposed in the first mounting cavity and is configured to supply power to the first vibrator and the control assembly;

wherein the flexible shell is connected to the connecting shaft, and the second wiring channel is communicated with the receiving cavity.

10. The massager according to claim 9, wherein the second main body portion comprises: a second shell assembly and a second vibrator;

wherein a second mounting cavity is formed in the second shell assembly defines therein, and the second shell assembly is connected to the connecting shaft;

wherein the second vibrator is disposed in the second mounting cavity, the power supply is further configured to supply the power to the second vibrator, and the second wiring channel is further communicated with the first mounting cavity and the second mounting cavity.

11. The massager according to claim 9, wherein the two opposite ends of the flexible outer housing respectively define a first accommodating cavity and a second accommodating cavity, the mounting portion is accommodated in the first accommodating cavity, the connecting shaft extends out of an opening of the first accommodating cavity, the second main body portion is detachably connected to the one end of the connecting shaft away from the mounting portion, and the second main body portion is accommodated in the second accommodating cavity;

wherein the main body further comprises: a first sleeve and a second sleeve;

wherein the first sleeve is sleeved on the connecting shaft and is disposed on a first side of the massage component, a first end of the first sleeve is sealingly connected to an edge of the opening of the first accommodating cavity, and a second end of the first sleeve extends into the mounting hole of the adjusting fitting piece and is in sealing fit with the adjusting fitting piece;

wherein the second sleeve is sleeved on the connecting shaft and is disposed on a second side of the massage component, a first end of the second sleeve is sealingly connected to an edge of an opening of the second accommodating cavity, and a second end of the second sleeve extends into the mounting hole of the adjusting fitting piece and is in sealing fit with the adjusting fitting piece.

12. The massager according to claim 11, wherein a first stop portion is disposed on one of the first sleeve and the second sleeve, and a second stop portion is disposed on a hole wall of the mounting hole;

wherein a range of the rotation angle of the massage component relative to the connecting shaft is defined by a relative position of the first stop portion in contact with the second stop portion.

13. The massager according to claim 11, wherein the main body further comprises a first sealing ring and a second sealing ring;

wherein the first sealing ring is disposed between the first sleeve and the adjusting fitting piece, and the second sealing ring is disposed between the second sleeve and the adjusting fitting piece.

14. The massager according to claim 7, wherein two first connecting holes are respectively protruded outward from two opposite end portions of the flexible outer housing, and the two first connecting holes are respectively disposed on two opposite sides of the massage component;

wherein two second connecting holes are defined on one side of the flexible outer housing away from the massage component, and the two second connecting holes are respectively disposed on the two opposite sides of the massage component.

15. The massager according to claim 1, wherein the extending axis of the massage component is substantially perpendicular to the connecting axis of the main body, and the connecting axis of the main body is located at a connection point of the extending axis of the massage component and the main body.

16. A massager comprising:

a main body;

a massage component; and an angle adjusting mechanism;

wherein a root of the massage component is rotatably mounted on the main body;

wherein the angle adjusting mechanism is disposed between the massage component and the main body to adjust an angle of an extending axis of the massage component around a connecting axis of the main body;

wherein the main body is in a ring shape and has a connecting shaft, and the massage component is rotatably mounted on the connecting shaft;

wherein the angle adjusting mechanism comprises an adjusting assembly and an adjusting fitting piece;

wherein the adjusting assembly is disposed on the connecting shaft, and the adjusting assembly comprises an elastic piece and an adjusting piece driven by the elastic piece;

wherein the adjusting fitting piece is fixedly connected to the massage component and configured to interact with the adjusting piece;

wherein when the massage component rotates around the connecting shaft, a rotation angle of the massage component relative to the main body is adjusted by an interaction between the adjusting piece and the adjusting fitting piece;

wherein the main body comprises a first main body portion, a second main body portion, and a flexible outer housing;

wherein the first main body portion comprises the connecting shaft and a mounting portion connected to the connecting shaft, and the mounting portion is in an arc shape;

wherein the second main body portion is in an arc shape and is connected to one end of the connecting shaft away from the mounting portion;

wherein the flexible outer housing is a ring structure having a notch, two opposite ends of the flexible outer housing are respectively sleeved on the mounting portion and the second main body portion;

wherein the connecting shaft is exposed at the notch and forms a complete ring structure together with the flexible outer housing;

wherein the adjusting assembly is mounted on the connecting shaft, the adjusting fitting piece is sleeved on the connecting shaft and is matched with the adjusting assembly, and the massage component is rotatable around the connecting shaft through the adjusting fitting piece.

17. The massager according to claim 16, wherein a mounting groove, is formed on the connecting shaft, and the adjusting assembly is mounted on the mounting groove.

18. The massager according to claim 16, wherein the massage component comprises a flexible shell and a first vibrator disposed in a receiving cavity of the flexible shell;

wherein the first main body portion comprises a first shell assembly, a control assembly, control buttons, and a power supply;

wherein the first shell assembly comprises the mounting portion and the connecting shaft, the mounting portion defines a first mounting cavity, and the connecting shaft defines a second wiring channel communicated with the first mounting cavity;

wherein the control assembly is disposed in the first mounting cavity, the control buttons are disposed on a surface of the first shell assembly facing an outside, and the control buttons are in signal connection with the control assembly;

wherein the power supply is disposed in the first mounting cavity and is configured to supply power to the first vibrator and the control assembly;

wherein the flexible shell is connected to the connecting shaft, and the second wiring channel is communicated with the receiving cavity.

19. The massager according to claim 18, wherein the second main body portion comprises: a second shell assembly and a second vibrator;

wherein a second mounting cavity is formed in the second shell assembly defines therein, and the second shell assembly is connected to the connecting shaft;

wherein the second vibrator is disposed in the second mounting cavity, the power supply is further configured to supply the power to the second vibrator, and the second wiring channel is further communicated with the first mounting cavity and the second mounting cavity.

* * * * *